(12) United States Patent
Kashima et al.

(10) Patent No.: US 7,057,687 B2
(45) Date of Patent: Jun. 6, 2006

(54) METHOD OF PATTERNING CHOLESTERIC FILM USING A LASER AND OPTICAL ELEMENT HAVING THE CHOLESTERIC FILM PATTERNED BY THE METHOD

(75) Inventors: Keiji Kashima, Shinjuku-Ku (JP); Koji Ishizaki, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/107,316

(22) Filed: Mar. 28, 2002

(65) Prior Publication Data

US 2002/0191144 A1  Dec. 19, 2002

(30) Foreign Application Priority Data

Mar. 30, 2001 (JP) ............................ 2001-100975
Mar. 30, 2001 (JP) ............................ 2001-101004

(51) Int. Cl.
    *G02F 1/1335* (2006.01)
(52) U.S. Cl. .......................... 349/115; 349/187; 430/20
(58) Field of Classification Search ........ 349/113–115; 430/20, 30
See application file for complete search history.

(56) References Cited

U.S. PATENT DOCUMENTS

| 4,734,558 | A   | * | 3/1988  | Nakano et al. ......... 219/121.73 |
| 6,099,786 | A   | * | 8/2000  | Hu et al. ..................... 264/400 |
| 6,459,847 | B1  | * | 10/2002 | Van De Witte et al. .... 385/147 |
| 6,667,793 | B1  | * | 12/2003 | Goulding et al. ........... 349/183 |
| 6,740,431 | B1  | * | 5/2004  | Hoshino et al. .............. 283/83 |

FOREIGN PATENT DOCUMENTS

| JP | 4-314757   | 11/1992 |
| JP | 10-227998  | 8/1998  |

* cited by examiner

*Primary Examiner*—Andrew Schechter
*Assistant Examiner*—Richard H Kim
(74) *Attorney, Agent, or Firm*—Oliff & Berridge, PLC

(57) ABSTRACT

The present invention provides a method of efficiently and precisely patterning cholesteric films. A cholesteric film 13 is firstly formed on an alignment film 12 provided on a glass substrate 11. The cholesteric film 13 is then patterned by partially volatilizing and removing a part of the cholesteric film 13 by the application of laser light 20 having a wavelength not falling in the selective reflection wave range of the cholesteric film 13. It is preferred that the wavelength of the laser light 20 be shorter than that of visible light. Alternatively, there may be used laser light 20 containing, as its main component, a component circularly polarized in the direction opposite to that of optical rotation of a component selectively reflected by the cholesteric film.

3 Claims, 1 Drawing Sheet

METHOD OF PATTERNING CHOLESTERIC FILM USING A LASER AND OPTICAL ELEMENT HAVING THE CHOLESTERIC FILM PATTERNED BY THE METHOD

BACKGROUND OF THE INVENTION

1. Field of the Invention

The present invention relates to a process for producing an optical element for use in displays such as a liquid crystal display. More particularly, the present invention relates to a method of patterning a film having a cholesteric order (i.e., a cholesteric film), and to an optical element including a cholesteric film patterned by the method.

2. Related Art

There have conventionally been proposed, as an optical element including a cholesteric film, a polarizing plate composed of laminates of a plurality of cholesteric liquid crystal layers having different chiral pitches (Japanese Laid-Open Patent Publications No. 271731/1996 and No. 264907/1999).

Such an optical element including a cholesteric film is often made in the following manner: a cholesteric film is formed on a large-sized glass substrate to obtain an original plate for optical elements, and, from this large-sized original plate, a plurality of optical elements are produced at one time. In this process, the glass substrate is notched in advance along lines corresponding to the peripheries of the optical elements to be finally produced, and the optical elements of the prescribed dimensions are separated from the original plate by exerting thereon a force needed. To ensure the separation of the optical elements from the original plate, it is desirable that those parts of the cholesteric film that correspond to the notches on the glass substrate also be removed beforehand.

Conventionally, cutting tools such as cutters are generally used for patterning of a cholesteric film in order to remove a part of the cholesteric film. However, if a cholesteric film is patterned by the use of cutting tools such as cutters, the patterned cholesteric film tend to have burrs or the like at the breaks in the films, and, in addition, become easy to come off.

We have made earnest studies on methods of patterning a cholesteric film; as a result, we have found that it is possible to efficiently and precisely pattern a cholesteric film by using laser light having a specific wavelength, or laser light containing, as its main component, a component circularly polarized in a specific direction.

SUMMARY OF THE INVENTION

The present invention has been accomplished on the basis of the above-described finding. An object of the present invention is therefore to provide a method of efficiently and precisely patterning a cholesteric film. Another object of the present invention is to provide an optical element including a cholesteric film patterned by the method.

The first aspect of the present invention is a method of patterning a cholesteric film, including the steps of: preparing a base having thereon a cholesteric film; and applying laser light to the cholesteric film so as to remove a part of the cholesteric film, the laser light having a wavelength falling outside the selective reflection wave range of the cholesteric film. It is preferable that the wavelength of the laser light be shorter than that of visible light. Further, the laser light may contain, as its main component, a component circularly polarized in the direction opposite to that of optical rotation of a component selectively reflected by the cholesteric film.

The second aspect of the present invention is a method of patterning a cholesteric film, including the steps of: preparing a base having thereon a cholesteric film; and applying laser light to the cholesteric film so as to remove a part of the cholesteric film, the laser light containing, as its main component, a component circularly polarized in the direction opposite to that of optical rotation of a component selectively reflected by the cholesteric film. It is preferable that the wavelength of the laser light be shorter than that of visible light.

The third aspect of the present invention is an optical element including: a base; and a cholesteric film formed on the base, wherein the cholesteric film has a pattern defined by removing a part of the cholesteric film by the application of laser light, the laser light having a wavelength falling outside the selective reflection wave range of the cholesteric film, and the cholesteric film has a crosslinking density in a section close to the removed part higher than that of another section in the cholesteric film. It is herein preferred that the surface area of a first main surface of the cholesteric film, disposed on a side of the base, be greater than that of a second main surface of the same, opposite to the first main surface.

The fourth aspect of the present invention is an optical element including: a base; and a cholesteric film formed on the base, wherein the cholesteric film has a pattern defined by removing a part of the cholesteric film by the application of laser light, the laser light containing, as its main component, a component circularly polarized in the direction opposite to that of optical rotation of a component selectively reflected by the cholesteric film, and the cholesteric film has a crosslinking density in a section close to the removed part higher than that of another section in the cholesteric film. It is herein preferred that the surface area of the first main surface of the cholesteric film, disposed on a side of the base, be greater than that of a second main surface of the same, opposite to the first main surface.

According to the present invention, a part of the cholesteric film is removed by applying, to the same, laser light that has a wavelength falling outside the selective reflection wave range of the cholesteric film, or contains, as its main component, a component circularly polarized in the direction opposite to that of optical rotation of a component selectively reflected by the cholesteric film. Therefore, it is possible to efficiently carry out patterning of the cholesteric film without suffering selective reflection of light.

Further, according to the present invention, if the laser light to be applied to the cholesteric film has a wavelength shorter than that of visible light, the cholesteric film is precisely patterned without producing carbide or the like.

DETAILED DESCRIPTION OF PREFERRED EMBODIMENTS

By referring to the accompanying drawings, embodiments of the present invention will be described hereinafter.

First Embodiment (Object to be Patterned)

First of all, the object to which the method in a first embodiment of the present invention is applied will be explained by referring to FIG. 1. In this first embodiment of the invention, the object to be patterned is explained by taking, as an example, an original plate for optical elements that is used to produce a polarizing plate or the like.

Figure 1:
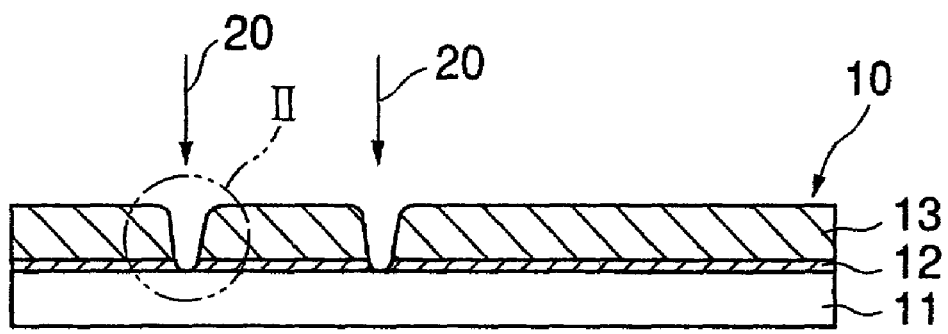
FIG. 1 is a schematic sectional view for explaining the method of patterning a cholesteric film, in first and second embodiments of the present invention.

As shown in FIG. 1, an original plate for optical elements to which the method in the first embodiment of the invention is applied includes: a glass substrate 11; an alignment film 12 laminated to the glass substrate 11; and a cholesteric film 13 formed on the alignment film 12, oriented by the alignment-regulating action of the surface of the alignment film 12. The glass substrate 11 and the alignment film 12 constitute a base.

The cholesteric film 13 has the property of selecting polarized light (the property of splitting polarized light), which a component of light circularly polarized in one direction is separated from a component circularly polarized in the opposite direction according to the physical arrangement of molecules in the cholesteric film 13 (planer arrangement). In such a cholesteric film 13, incident light that has entered into the helical axis of the planer arrangement is split into a component circularly polarized in the right (right-handed polarized light) and a component circularly polarized in the left (left-handed polarized light); one of these components is transmitted, and the other one is reflected. This phenomenon is widely known as circular dichroism. When the direction of optical rotation of the circularly polarized components is properly selected in terms of incident light, the component circularly polarized in the same direction as that of the helical axis of the cholesteric film 13 is selectively reflected.

The scattering of polarized light that is reflected becomes maximum at the wavelength $\lambda_0$ defined by the following equation (1):

$$\lambda_0 = n_{av} \cdot p \quad (1)$$

wherein p is a chiral pitch (helical pitch), and $n_{av}$ is a mean refractive index on a plane perpendicular to the helical axis.

Further, the width $\Delta\lambda$ of the wave range of the reflected light is represented by the following equation (2):

$$\Delta\lambda = \Delta n \cdot p \quad (2)$$

wherein $\Delta n$ is an index of double refraction, and p is a chiral pitch.

Namely, either the right-handed or left-handed circularly polarized component of light whose wavelength is in the range centering around the wavelength $\lambda_0$, having the width $\Delta\lambda$ of the wave range (selective reflection wavelength range) is reflected by the cholesteric film 13, and the other circularly polarized component and light whose wavelength does not fall in the above range are transmitted. Upon reflection, the right-handed or left-handed circularly polarized component is reflected as it is without changing its phase.

To form the cholesteric film 13, a polymerizable monomer or oligomer may be used. In addition, a liquid crystalline polymer may also be used.

Examples of polymerizable monomers useful for forming the cholesteric film 13 include liquid crystalline monomers and mixtures of chiral compounds as described in Japanese Laid-Open Patent Publication No. 258638/1995 and Published Japanese Translation No. 508882/1998 of PCT International Publication. Examples of polymerizable oligomers that can be used to form the cholesteric film 13 include cyclic organopolysiloxane compounds having cholesteric phases as described in Japanese Laid-Open Patent Publication No. 165480/1982.

Examples of liquid crystalline polymers suitable for forming the cholesteric film 13 include polymers having mesogen groups, which make polymers liquid crystalline, in the main chain, in the side chains, or in both the main and side chains; high-molecular-weight cholesteric liquid crystals having cholesteryl groups introduced into the side chains; and liquid crystalline polymers as described in Japanese Laid-Open Patent Publications No. 133810/1997 and No. 293252/1999.

Figure 2:
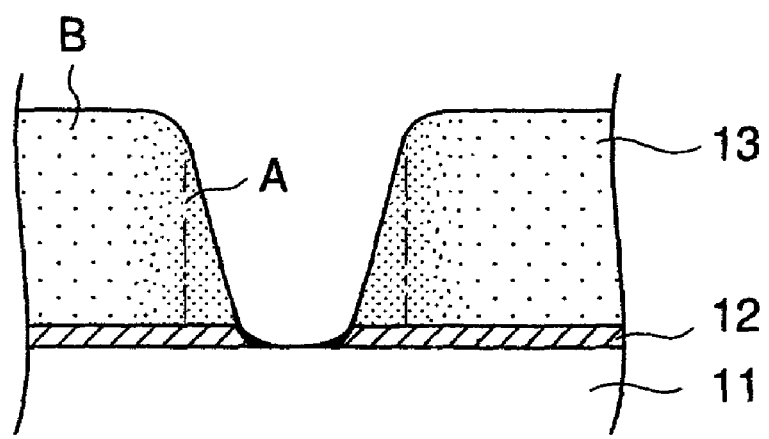
FIG. 2 is an enlarged cross-sectional view of part II of FIG. 1.

By referring now to FIGS. 1 and 2, the method in the first embodiment of the present invention is explained.

(Preparatory Step)

First of all, a cholesteric film 13 is formed on an alignment film 12 provided on a glass substrate 11 as shown in FIG. 1.

In the case where a polymerizable monomer or oligomer is used to form the cholesteric film 13, it is firstly applied to the alignment film 12 provided on the glass substrate 11 to align its molecules by the alignment-regulating action of the surface of the alignment film 12. The polymerizable monomer or oligomer applied to the alignment film 12 thus forms a liquid crystal layer. If the polymerizable monomer or oligomer is allowed to form a liquid crystal layer at a predetermined temperature, the layer formed is nematic. If any chiral agent is added to this liquid crystal layer, the layer becomes chiral nematic (cholesteric). It is herein preferable to add a chiral agent in an amount of several to 10% of the layer. It is noted that it is possible to regulate the selective reflection wave range, which is brought about by the cholesteric structure of the polymerizable monomer or oligomer molecules, by varying the chiral power using different types of chiral agents, or by changing the concentration of the chiral agent in the liquid crystal layer.

The polymerizable monomer or oligomer molecules aligned are then three-dimensionally crosslinked, and thus polymerized to form the cholesteric film 13. To three-dimensionally cross-link the polymerizable monomer or oligomer molecules, there may be adopted such a method that, after adding a photopolymerization initiator to this material, the mixture is cured by the application of ultraviolet light, or that electron rays are directly applied to this material for curing. By "three-dimensional cross-linkage" is herein meant that a polymerizable monomer or oligomer is three-dimensionally polymerized so that the resulting polymer can have a network structure. If such a network polymer is obtained, the cholesteric liquid crystalline state can optically be fixed, and a film that is easy to handle as an optical film and stable at normal temperatures can be obtained.

The polymerizable monomer or oligomer to be used for forming the cholesteric film 13 may be made into a coating liquid by dissolving it in a solvent. In this case, it is necessary to add the drying step of evaporating the solvent before three-dimensionally crosslinking the polymerizable monomer or oligomer molecules.

On the other hand, if a liquid crystalline polymer is used to form the cholesteric film 13, it is firstly applied to the alignment film 12 provided on the glass substrate 11 to align its molecules by the alignment-regulating action of the surface of the alignment film 12. The liquid crystalline polymer applied to the alignment film 12 thus forms a liquid crystal layer. Usable herein as the liquid crystalline polymer is a cholesteric liquid crystalline polymer having chirality, and a mixture of a nematic liquid crystalline polymer and a cholesteric liquid crystalline polymer. The selective reflection wave range, which is brought about by the cholesteric structure of the polymer molecules, can herein be regulated in the following manner: in the case where a cholesteric liquid crystalline polymer is used, the chiral power of the polymer molecules is controlled by such a conventional method that the content of bent chains containing chiral components or the copolymerization ratio of a mesogen monomer with a chiral mesogen monomer is adjusted (see Naoyuki KOIDE and Kunisuke SAKAMOTO: *EKISHO PORIMA* (or "Liquid Crystalline Polymers"), Kyoritsu Shuppan Kabushiki Kaisha, Japan, 1998); while when a mixture of a nematic liquid crystalline polymer and a cholesteric liquid crystalline polymer is used, the mixing ratio of the two polymers is changed.

The oriented liquid crystalline polymer is then cooled; it becomes glassy and forms the cholesteric film 13. It is noted that the state of liquid crystalline polymers varies with temperature. For instance, a liquid crystalline polymer having a glass transition temperature of 90° C. and an isotropic transition temperature of 200° C. is cholesteric at a temperature between 90° C. and 200° C.; when this polymer is cooled to room temperature, it becomes glassy, and this glassy state is fixed with the cholesteric structure of the polymer maintained.

The liquid crystalline polymer to be used for forming the cholesteric film 13 may be made into a coating liquid by dissolving it in a solvent. In this case, it is necessary to add, before cooling, the drying step of evaporating the solvent.

(Patterning Step)

The cholesteric film 13 is then patterned by partially volatilizing and removing a part of the cholesteric film 13 by the application of laser light 20 having a wavelength not falling in the selective reflection wave range of the cholesteric film 13. Preferably, the laser light 20 has a wavelength shorter than that of visible light. Further, the laser light 20 may contain, as its main component, a component circularly polarized in the direction opposite to that of optical rotation of a component selectively reflected by the cholesteric film 13.

In the patterned cholesteric film 13, as shown in FIG. 2, the section A close to the removed part has a crosslinking density higher than that of the other section B due to the heat applied to the cholesteric film 13 by the laser light 20. In addition, upon patterning, a part of the cholesteric film 13 is removed more greatly on the laser-light-entering side than on the base side as shown in FIG. 2, so that the surface area of the base-side surface (the first main surface in contact with the alignment film 12) of the patterned cholesteric film is greater than that of the non-base-side surface (the second main surface not in contact with the alignment film 12) of the same. Therefore, the patterned cholesteric film 13 does not easily come off the glass substrate 11 (alignment film 12).

According to the first embodiment of the present invention, since laser light 12 having a wavelength not falling in the selective reflection wave range of the cholesteric film 13 is applied to the cholesteric film 13 to partially volatilize and remove a part of the cholesteric film 13, it is possible to efficiently carry out the patterning of the cholesteric film 13 without suffering selective reflection of light.

Further, according to the first embodiment of the present invention, if the laser light 20 to be applied to the cholesteric film 13 has a wavelength shorter than that of visible light, the cholesteric film 13 is precisely patterned without producing carbide or the like.

Second Embodiment

Next, the second embodiment of the present invention will be described. The second embodiment of the invention is the same as the foregoing first embodiment of the invention, except that laser light containing, as its main component, a component circularly polarized in the direction opposite to that of optical rotation of a component selectively reflected by the cholesteric film is used. Specifically, in the above explanation for the first embodiment, the description for the constitution of the object to be patterned (the item "Object to be Patterned"), and a part of the description for the method of patterning a cholesteric film (the item "Preparatory Step") are applicable to the second embodiment as they are. Therefore, only the patterning step in the second embodiment of the method of patterning a cholesteric film will be hereinafter explained in detail.

(Patterning Step)

A cholesteric film 13 is formed on an alignment film 12 provided on a glass substrate 11 as shown in FIG. 1, in the same manner as in the above-described first embodiment. Thereafter, the cholesteric film 13 is patterned by partially volatilizing and removing a part of the cholesteric film 13 by the application of laser light 20 containing, as its main component, a component circularly polarized in the direction opposite to that of optical rotation of a component selectively reflected by the cholesteric film 13. It is preferable that the wavelength of the laser light 20 be shorter than that of visible light.

In the patterned cholesteric film 13, as shown in FIG. 2, the section A close to the removed part has a crosslinking density higher than that of the other section B due to the heat applied to the cholesteric film 13 by the laser light 20. In addition, upon patterning, a part of the cholesteric film 13 is removed more greatly on the laser-light-entering side than on the base side as shown in FIG. 2, so that the surface area of the base-side surface (the first main surface in contact with the alignment film 12) of the patterned cholesteric film is greater than that of the non-base-side surface (the second main surface not in contact with the alignment film 12) of the same. Therefore, the patterned cholesteric film 13 does not easily come off the glass substrate 11 (alignment film 12).

Thus, according to the second embodiment of the present invention, since laser light 20 containing, as its main component, a component circularly polarized in the direction opposite to that of optical rotation of a component selectively reflected by the cholesteric film 13 is applied to the cholesteric film 13 to partially volatilize and remove a part of the cholesteric film 13, it is possible to efficiently carry out patterning of the cholesteric film 13 without suffering selective reflection of light.

Further, according to the second embodiment of the present invention, if the laser light 20 to be applied to the cholesteric film 13 has a wavelength shorter than that of visible light, the cholesteric film 13 is precisely patterned without producing carbide or the like.

EXAMPLES

The aforementioned first embodiment of the present invention will be specifically explained by referring to the following Examples.

Example 1-1

89 parts of a monomer containing, in its molecule, polymerizable acrylates at the both ends and spacers between mesogen existing at the center and the acrylates, having a nematic-isotropic transition temperature of 110° C., and 11 parts of a chiral agent having, in its molecule, polymerizable acrylates at the both ends were dissolved in toluene. To this toluene solution was added a photopolymerization initiator in an amount of 5% by weight of the above monomer.

On the other hand, a transparent glass substrate was spin-coated with polyimide dissolved in a solvent. After drying, the polyimide was allowed to form a film at 200° C. (film thickness 0.1 μm). This film was rubbed in a definite direction to obtain an alignment film.

The glass substrate provided with the alignment film was set in a spin-coater, and the alignment film was spin-coated with the above-prepared toluene solution.

The toluene contained in the toluene solution was then evaporated at 80° C. It was visually confirmed by selective reflection of light that the coating film formed on the alignment film was cholesteric.

Ultraviolet light was applied to the above coating film to allow the photopolymerization initiator contained in the coating film to generate radicals, thereby three-dimensionally crosslinking the acrylates in the monomer molecules for polymerization. Thus, a cholesteric coating film was formed on the alignment film. The thickness of this cholesteric coating film was 2 μm. By the measurement made by using a spectrophotometer, it was found that the center of the selective reflection wave range was in the vicinity of 530 nm and that the width of the wave range was 50 nm.

It was tried to remove a part (50 μm φ) of the above cholesteric coating film by applying thereto YAG laser light. The results were as shown in Table 1.

TABLE 1

| Type of Laser | Wavelength | State of Patterning |
| --- | --- | --- |
| YAG | 1064 nm (fundamental wave) | The film could be removed (carbide was produced). |
| YAG | 532 nm (second harmonics) | It was difficult to remove the film because the film reflected light. |
| YAG | 355 nm (third harmonics) | The film could be removed. |
| YAG | 266 nm (fourth harmonics) | The film could be removed. |

Example 1-2

A liquid crystalline polymer containing acrylic side chains, having a glass transition temperature of 75° C. and an isotropic transition temperature of 190° C. was dissolved in toluene.

On the other hand, a transparent glass substrate was spin-coated with polyimide dissolved in a solvent. After drying, the polyimide was allowed to form a film at 200° C. (film thickness 0.1 μm). This film was rubbed in a definite direction to obtain an alignment film.

The glass substrate provided with the alignment film was set in a spin-coater, and the alignment film was spin-coated with the above-prepared toluene solution.

The toluene contained in the toluene solution was then evaporated at 90° C., and the coating film formed on the alignment film was held at a temperature of 150° C. for 10 minutes. Thereafter, it was visually confirmed by selective reflection of light that the coating film formed on the alignment film was cholesteric. This coating film was cooled to room temperature to cause the transition from the liquid crystalline state to the glassy state, thereby obtaining a cholesteric coating film. The thickness of this cholesteric coating film was 2 μm. By the measurement made by using a spectrophotometer, it was found that the center of the selective reflection wave range was in the vicinity of 530 nm and that the width of the wave range was 60 nm.

It was tried to remove a part (50 μm φ) of the above cholesteric coating film by applying thereto YAG laser light. The results were as shown in Table 2.

TABLE 2

| Type of Laser | Wavelength | State of Patterning |
| --- | --- | --- |
| YAG | 1064 nm (fundamental wave) | The film could be removed (carbide was produced). |
| YAG | 532 nm (second harmonics) | It was difficult to remove the film because the film reflected light. |
| YAG | 355 nm (third harmonics) | The film could be removed. |
| YAG | 266 nm (fourth harmonics) | The film could be removed. |

(Results of Evaluation of Examples 1-1 and 1-2)

As shown in Tables 1 and 2, it was possible to efficiently remove a part of the cholesteric coating films by applying thereto laser light having a wavelength not falling in the selective reflection wave ranges of the cholesteric coating films. Further, when the laser light to be applied had a wavelength shorter than that of visible light, the cholesteric coating films were precisely patterned without producing carbide or the like.

Next, the aforementioned second embodiment of the present invention will be specifically explained by referring to the following Examples.

Example 2-1

89 parts of a monomer containing, in its molecule, polymerizable acrylates at the both ends and spacers between mesogen existing at the center and the acrylates, having a nematic-isotropic transition temperature of 110° C., and 11 parts of a chiral agent having, in its molecule, polymerizable acrylates at the both ends were dissolved in toluene. To this toluene solution was added a photopolymerization initiator in an amount of 5% by weight of the above monomer.

On the other hand, a transparent glass substrate was spin-coated with polyimide dissolved in a solvent. After drying, the polyimide was allowed to form a film at 200° C. (film thickness 0.1 μm). This film was rubbed in a definite direction to obtain an alignment film.

The glass substrate provided with the alignment film was set in a spin-coater, and the alignment film was spin-coated with the above-prepared toluene solution.

The toluene contained in the toluene solution was then evaporated at 80° C. It was visually confirmed by selective reflection of light that the coating film formed on the alignment film was cholesteric.

Ultraviolet light was applied to the above coating film to allow the photopolymerization initiator contained in the coating film to generate radicals, thereby three-dimensionally crosslinking the acrylates in the monomer molecules for polymerization. Thus, a cholesteric coating film was formed on the alignment film. The thickness of this cholesteric coating film was 2 μm. By the measurement made by using a spectrophotometer, it was found that the center of the selective reflection wave range was in the vicinity of 530 nm and that the width of the wave range was 50 nm. Further, the cholesteric coating film was found to have the property of reflecting a right-handed circularly polarized component in the selective reflection wave range.

It was tried to remove a part (50 μm φ) of the above cholesteric coating film by applying thereto YAG laser light. The results were as shown in Table 3.

TABLE 3

| Type of Laser | Wavelength | State of Polarization | State of Patterning |
|---|---|---|---|
| YAG | 532 nm (second harmonics) | random | It was difficult to remove the film because the film reflected light. |
| YAG | 532 nm (second harmonics) | right-handed circular polarization | The film could not be removed because the film greatly reflected light. |
| YAG | 532 nm (second harmonics) | left-handed circular polarization | The film could be removed. |

Example 2-2

A liquid crystalline polymer containing acrylic side chains, having a glass transition temperature of 75° C. and an isotropic transition temperature of 190° C. was dissolved in toluene.

On the other hand, a transparent glass substrate was spin-coated with polyimide dissolved in a solvent. After drying, the polyimide was allowed to form a film at 200° C. (film thickness 0.1 μm). This film was rubbed in a definite direction to obtain an alignment film.

The glass substrate provided with the alignment film was set in a spin-coater, and the alignment film was spin-coated with the above-prepared toluene solution.

The toluene contained in the toluene solution was then evaporated at 90° C., and the coating film formed on the alignment film was held at a temperature of 150° C. for 10 minutes. Thereafter, it was visually confirmed by selective reflection of light that the coating film formed on the alignment film was cholesteric. This coating film was cooled to room temperature to cause the transition from the liquid crystalline state to the glassy state, thereby obtaining a cholesteric coating film. The thickness of this cholesteric coating film was 2 μm. By the measurement made by using a spectrophotometer, it was found that the center of the selective reflection wave range was in the vicinity of 530 nm and that the width of the wave range was 60 nm. Further, the cholesteric film was found to have the property of reflecting right-handed circularly polarized component in the selective reflection wave range.

It was tried to remove a part (50 μm φ) of the above cholesteric coating film by applying thereto YAG laser light. The results were as shown in Table 4.

TABLE 4

| Type of Laser | Wavelength | State of Polarization | State of Patterning |
|---|---|---|---|
| YAG | 532 nm (second harmonics) | random | It was difficult to remove the film because the film reflected light. |

TABLE 4-continued

| Type of Laser | Wavelength | State of Polarization | State of Patterning |
|---|---|---|---|
| YAG | 532 nm (second harmonics) | right-handed circular polarization | The film could not be removed because the film greatly reflected light. |
| YAG | 532 nm (second harmonics) | left-handed circular polarization | The film could be removed. |

Example 2-3

The procedure of Example 2-1 was repeated to form a cholesteric coating film. It was then tried to remove a part (50 μm φ) of this cholesteric coating film by applying thereto YAG laser light, containing as its main component a left-handed circularly polarized component, having a wavelength not falling in the selective reflection wave range.

The results were as shown in Table 5.

TABLE 5

| Type of Laser | Wavelength | State of Polarization | State of Patterning |
|---|---|---|---|
| YAG | 1064 nm (fundamental wave) | left-handed circular polarization | The film could be removed (carbide was produced). |
| YAG | 532 nm (second harmonics) | left-handed circular polarization | The film could be removed. |
| YAG | 355 nm (third harmonics) | left-handed circular polarization | The film could be excellently removed. |
| YAG | 266 nm (fourth harmonics) | left-handed circular polarization | The film could be excellently removed. |

(Results of Evaluation of Example 2-1, 2-2 and 2-3)

As show in Tables 3 and 4, it was possible to efficiently remove a part of the cholesteric coating films by applying thereto laser light containing, as its main component, a component (left-handed circularly polarized component) circularly polarized in the direction opposite to that of optical rotation of a component selectively reflected by the cholesteric coating films. Further, as shown in Table 5, when the laser light to be applied had a wavelength shorter than that of visible light, the cholesteric coating films were precisely patterned without producing carbide or the like.

What is claimed is:

1. A method of patterning a cholesteric film, comprising the steps of:
   preparing a base having thereon a cholesteric film; and
   applying laser light to the cholesteric film so as to remove a part of the cholesteric film, the laser light containing, as its main component, a component circularly polarized in a direction opposite to that of optical rotation of a component selectively reflected by the cholesteric film.

2. The method according to claim 1, wherein the laser light has a wavelength shorter than that of visible light.

3. A method of patterning a cholesteric film, comprising the steps of:
   preparing a base having thereon a cholesteric film that selectively reflects a component of light circularly polarized in a specific direction within a selective reflective wavelength range; and applying laser light to the cholesteric film to remove a part of the cholesteric film, the laser light having a wavelength falling outside the selective reflection wavelength range of the cholesteric film and containing, as a main component of the laser light, a component circularly polarized in a direction opposite to that of optical rotation of a component selectively reflected by the cholesteric film.

* * * * *